United States Patent
Davies

(10) Patent No.: US 6,902,606 B1
(45) Date of Patent: Jun. 7, 2005

(54) RELEASE AGENT FORMULAS AND METHODS

(75) Inventor: Gordon Davies, Dana Point, CA (US)

(73) Assignee: Reclamation Consulting and Applications, Inc., Lake Forest, CA (US)

( * ) Notice: Subject to any disclaimer, the term of this patent is extended or adjusted under 35 U.S.C. 154(b) by 0 days.

(21) Appl. No.: 10/746,574

(22) Filed: Dec. 23, 2003

(51) Int. Cl.[7] ............................................. B22C 3/00
(52) U.S. Cl. .................. 106/2; 106/38.24; 426/610; 426/611; 426/612; 426/613; 508/491
(58) Field of Search .................... 106/38.24, 2, 8, 106/9; 426/610–613; 508/491

(56) References Cited

U.S. PATENT DOCUMENTS 5,494,502 A * 2/1996 DeLong ..................... 106/2

2002/0172759 A1 * 11/2002 LaFay et al. ............... 427/133

OTHER PUBLICATIONS

Gates Corporation, Viscosity Data, Copyright 1999–2004, □□http;//www.gates.com/brochure.cfm?brochure=2625&location__id=3046.*

Gates Corporation website, Viscosity Date.

* cited by examiner

Primary Examiner—C. Melissa Koslow
Assistant Examiner—Shalie Manlove
(74) Attorney, Agent, or Firm—Rutan & Tucker, LLP

(57) ABSTRACT

High viscosity release agents inhibit undesirable sticking of asphalt, concrete, and other materials. The release agents can be used on forms, containers, mixers and various other items. Preferred formulations have little or no water, and are durable enough that a single application is generally suitable for multiple uses without reapplication.

14 Claims, 2 Drawing Sheets

RELEASE AGENT FORMULAS AND METHODS

FIELD OF THE INVENTION

The present invention relates generally to chemical coatings. The present invention relates more particularly to improved release agents for mitigating undesirable sticking of asphalt, concrete, and the like to various surfaces.

BACKGROUND OF THE INVENTION

Prior art release agents for mitigating undesirable sticking of asphalt and concrete to these and other surfaces are well known. These release agents are commonly used to mitigate the sticking of such material to the surfaces of containers, mixers, forms and the like.

As those skilled in the art will appreciate, it is undesirable to have asphalt and concrete stick to such surfaces. When these materials stick to containers and mixers, it is often necessary to clean these items. Cleaning containers and mixers is typically a labor intensive task and is therefore generally time consuming and expensive.

Forms are used to define the shape of structures to be formed with concrete. For example, a wooden form may be used to define the shape of a roadway to be made by pouring concrete into the form. Once the material has cured somewhat, the form is typically removed. Of course, if the concrete sticks to the form, then it may be very difficult to remove the form from the structure.

Asphalt is commonly transported in the bed of a truck, such as for delivery from an asphalt plant to a job site. It is undesirable to have the asphalt stick to the truck bed.

Release agents are commonly applied to containers, mixers, truck beds and forms prior to pouring asphalt or concrete into them. Release agents are applied in numerous ways, including brushing, swabbing, or spraying, and upon application act as a physical barriers to mitigate adhesion of the asphalt or concrete to the relevant surfaces. This is somewhat analogous to the use of butter or shortening to mitigate the sticking of cake batter to a pan.

A commonly used release agent is diesel fuel. Diesel is inexpensive, readily available, and works reasonably well. It adheres fairly well to most surfaces, due to its high viscosity of around 68 (for no. 2D). Diesel is also relatively heavy, having a specific gravity of about 25 to 40 (with "Grade 1-D" around 40 and "Grade 2-D" around 35). Unfortunately, use of diesel fuel is unnecessarily polluting to the environment.

Some contemporary release agents comprise soybean oil in combination with various chemicals and additives. For example, it is known to use a mixture of 20%, by weight, or more of water in combination with soybean oil as a release agent. Various additives may be included to enhance emulsification of the water and soybean oil, encourage foaming, help the mixture spread when applied, make the mixture more visible, and/or provide a desired scent.

Although contemporary release agents have found widespread acceptance in the marketplace, such formulations suffer from inherent deficiencies. For example, a contemporary release agent comprising a mixture of soybean oil and water can generally only be used once. That is, a new application of such a contemporary release agent is generally required for each use. For example, each time a mixer or truck bed is filled with concrete or asphalt, or each time a wooden form is used for one of these materials, the release agent must typically be re-applied.

The re-application of a release agent for each use of a container, mixer, or form is undesirably costly. Not only must additional quantities of the release agent be used, but labor must be expended to perform the task of re-application.

Prior attempts to mitigate the deficiencies of such contemporary release agents include the use of permanent or semi-permanent anti-stick coatings, such as Teflon™ (a federally registered trademark of du Pont de Nemours and Company of Wilmington, Del.), as disclosed in U.S. Pat. No. 4,087,072, entitled FORM MEANS FOR FABRICATING PRE-CAST STRUCTURAL PANELS. However, in many applications the abrasive nature of asphalt and concrete makes the use of such permanent or semi-permanent coatings impractical. That is, the Teflon coating must be reapplied or the coated item must be discarded more frequently than is economically feasible.

In view of the foregoing, it is desirable to provide a more durable, yet economically feasible, release agent for mitigating undesirable sticking of asphalt, concrete, and the like to various surfaces.

SUMMARY OF THE INVENTION

In accordance with one aspect of the present invention, an improved release agent for asphalt, concrete and the like has a viscosity greater than approximately 65 cSt or a specific gravity less than approximately 0.95.

Preferred release agents comprises mostly oil, and especially a biodegradable and otherwise environmentally "friendly" oil such as soybean oil. However, contemplated release agents may comprise any desired oil or combination of oils. The oils can be filtered or unfiltered, having solids in approximately 6–10 weight percent (wt %). There are numerous less preferred oils. For example, suitable release agents can comprise a very heavy oil or grease such as yellow grease #2, preferably having approximately 14–18% wt % of solids.

To achieve a high viscosity, preferred release agents comprise less than 20 wt % water, and more preferably less than 2 wt % weight. Especially preferred release agents comprises substantially no water.

Contemplated release agents can comprise any of several other ingredients, including for example, a foaming agent, an emulsifier, a surfactant, a fragrance, and/or a coloring agent.

According to another aspect, the present invention comprises a method for forming a structure, by applying one of the inventive release agents to a form, mold, truck bed, mixer or other device, and then pouring or otherwise filling the device with asphalt, concrete, or another material to define the structure. The form, mold, or other device is then removed, leaving the structure intact.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
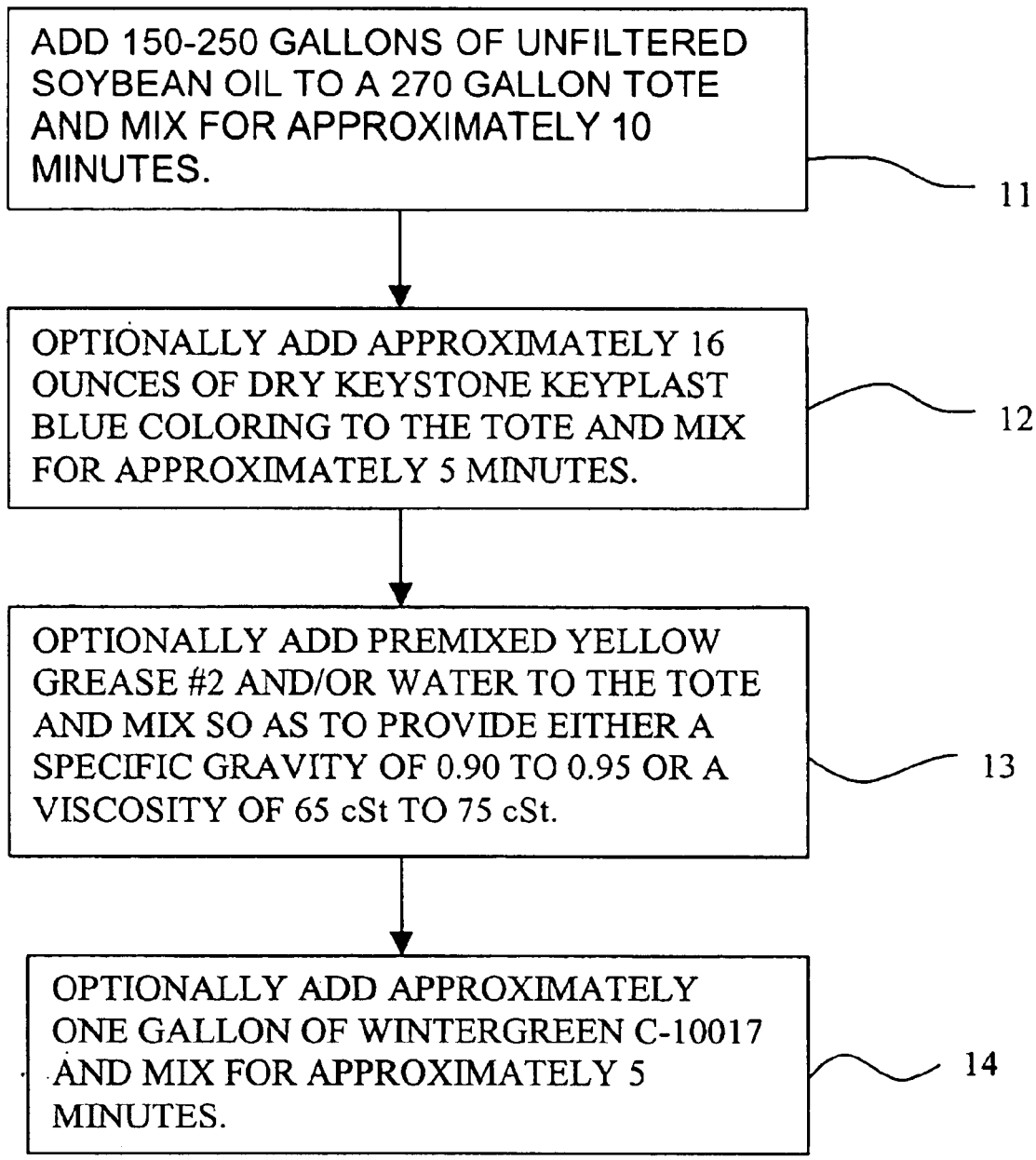
FIG. 1 is a flow chart showing one exemplary method for mixing a release agent according to the present invention.

According to one aspect, the present invention comprises a release agent having a relatively high viscosity and/or high specific gravity, resulting from a high concentration of oil. Many different oils can be used, but soybean oil is currently preferred because it provides the needed physical characteristics, is environmentally friendly, is readily available, and at least in a reprocessed form, is relatively inexpensive. Other oils and/or combinations of oils are also suitable, however, and the discussion of soybean oil herein is by way of example only, and not by way of limitation. The term oil is used in its broadest sense, to include all manner of greases and fats.

In particular, contemplated release agents may include any desired vegetable oil, mineral oil, petroleum oil, or other type of oil, as well as combinations thereof. Examples of suitable vegetable oils other than soybean oil are canola oil and palm oil. Those skilled in the art will appreciate that many other oils are likewise suitable.

Preferred release agents have a viscosity of greater than approximately 65 cSt and/or a specific gravity of less than approximately 0.95. More preferred release agents have a viscosity of between approximately 65–75 cSt, and/or has a specific gravity of between approximately 0.90 and 0.95. All ranges set forth herein should be interpreted as being inclusive of their endpoints, and all endpoints are deemed to be approximate. Most preferred release agents have a specific gravity of approximately 0.92–0.93 and/or has a viscosity of approximately 69–71 cSt. According to one exemplary embodiment, the release agent has a specific gravity of approximately 0.9242 and a viscosity of approximately 71.47 cSt.

All specific gravity values provided herein are for 60° F. All viscosity values provided herein are kinematic viscosity values for 25° C. and are given in centistokes (cSt).

The desired viscosity and/or specific gravity may be obtained by using pure or substantially pure soybean oil. Generally, unfiltered soybean oil having approximately six to ten percent solids is preferred. However, filtered soybean oil or soybean oil having other percentages of solids may alternatively be utilized. Used soybean oil, such as that previously used in cooking processes, may optionally be used. Further, a blend of new soybean oil and used soybean oil may be used in any desired combination. Used soybean oil can be used even if it is not strained, filtered, or otherwise processed.

Other substances, such as other oils, grease, and/or water may be added to the main oil. Such additives may be added to provide the desired viscosity and/or specific gravity, or for some other purpose such as enhanced release qualities, reduced cost, better adhesion to surfaces and/or better spreading.

Additives such as fragrances, coloring, surfactants, emulsifiers and/or foaming agents may be employed. As those skilled in the art will appreciate, the addition of a fragrance may increase the marketability of the release agent by making it more pleasant to work with. Coloring may make the release agent easier to see, which can be important when the agent is applied to the inner walls of a poorly illuminated container, or to establish that multiple uses can be made of an earlier application with little or no re-application. Similarly, the addition of a foaming agent may make the release agent easier to see, help it cover surfaces, and provide enhanced release properties. A surfactant may be found useful because it generally causes the release agent to spread more evenly upon a surface. An emulsifier may also be beneficial, especially when water is added to the formulation to inhibit separation of the water from the oil.

Referring now to FIG. 1, one exemplary process for formulating the release agent of the present invention comprises adding 150 to 250 gallons of unfiltered soybean oil to a 270 gallon tote and mixing the soybean oil for approximately 10 minutes, as shown in block 11.

Optionally, approximately 16 ounces of dry Keystone™ Keyplast™ Blue coloring are added to the tote, and mixed into the soybean oil for approximately 5 minutes, as shown in block 12. Other coloring agents can additionally or alternatively be used.

Optionally, premixed yellow grease #2 and/or water is also added to the tote, and mixed for approximately 20 minutes as shown in block 13. The yellow grease is preferably premixed for approximately 10 minutes. In what is currently considered to be an ideal mixture, the quantities of yellow grease and/or water added in quantities that provide a specific gravity of the release agent of between 0.90 and 0.95, and/or that provide a viscosity of the resulting release agent of between 65 cSt and 75 cSt. Generally, adding yellow grease will increase the specific gravity of the release agent and will increase the viscosity thereof, while adding water will generally increase the specific gravity of the release agent and decrease the viscosity.

Optionally, approximately 1 gallon of Wintergreen C-1007 fragrance is added to the tote and mixed for approximately 5 minutes, as shown in block 14. Of course, an innumerable number of other fragrances are also suitable. Any desired surfactant, emulsifier, and/or foaming agent may also be added.

Despite the fact that a myriad of different substances and additives may optionally be added as discussed above, one of the simplest and most effective formulations consists entirely or almost entirely of soybean oil (either new or used). An especially preferred formulation in accordance with the example discussed above has a specific gravity of approximately 0.925 and a a viscosity of approximately 70 cSt.

According to another aspect, the present invention comprises a method for forming a structure. Various different structures can be formed according to the present invention, including, for example, roadways, sidewalks, and curbs. As is well-known, such structures can be formed from asphalt or concrete. Additionally, building structures such as foundations and walls (such as those of concrete tilt-up construction) can similarly be formed. Indeed, those skilled in the art will appreciate that many different types of structures may be formed according to the present invention.

Figure 2:
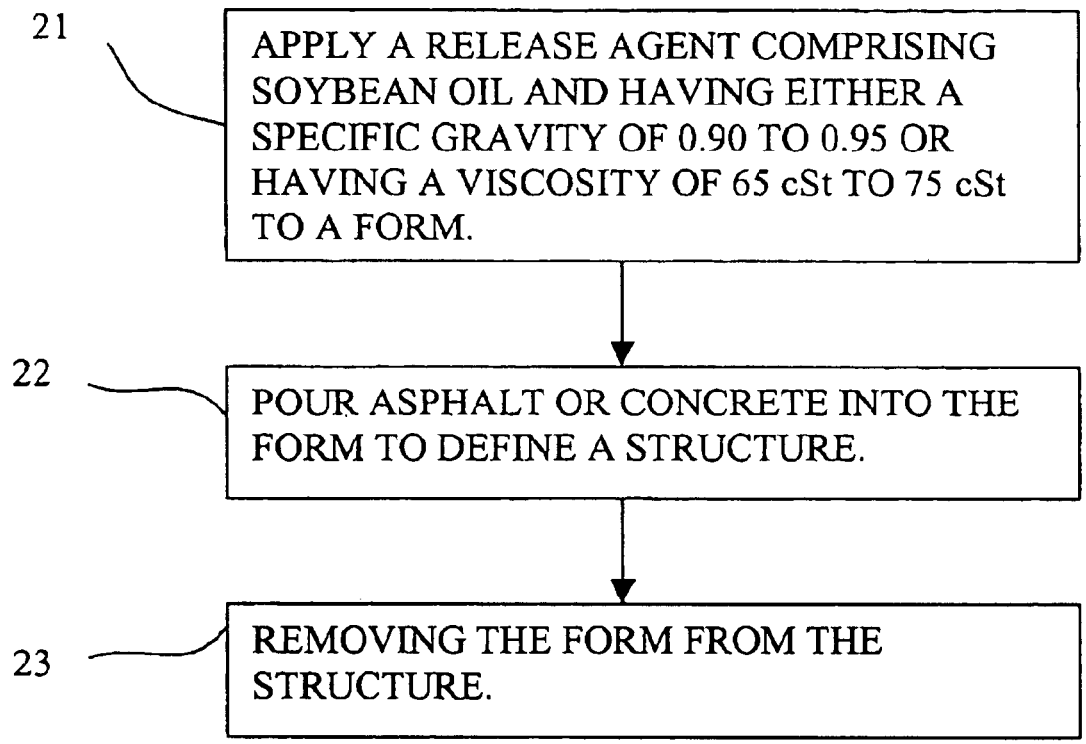
FIG. 2 is a flow chart showing one exemplary application of the release agent according to the present invention.

Referring now to FIG. 2, one example of forming a structure according to the present invention comprises applying a release agent formulated as described above to forms as shown in block 21. The forms may be wooden forms, metal forms, fiberglass forms, or forms made of any other desired material.

One advantage of applying a release agent according to the present invention to the forms (as opposed to applying a contemporary release agent to the forms), is that the release agent of the present invention is typically suitable for 4 to 12 uses. Contemporary release agents are typically only suitable for a single use. Thus, the use of a release agent formulated according to the present invention provides cost reductions both with respect to materials by reducing the amount of release agent required and with respect to labor by reducing the need for repeated applications thereof.

Focusing again on FIG. 2, asphalt, concrete, or the like is poured into the form as shown in block 22. As those skilled in the art will appreciate, various formulations of asphalt (and other heated bituminous aggregates) and concrete (including cement) may be utilized. Indeed, various other structural materials may be similarly utilized. Examples of other structural materials include epoxy resins and composite materials such as fiberglass, Kevlar™, and graphite fiber reinforced composite (GFRC).

Once the structure has at least partially cured, the form is removed from the structure as shown in block 23. Typically, forms are removed by disassembling them from the structure. Alternatively, the structure may be removed from the form in a manner which leaves the form generally intact.

As used herein, the term "form" is defined to include any mold, die, or other device which is used to define the shape of asphalt, concrete, or other material until the material at least partially cures.

In addition to providing a release agent for forms, the present invention provides a release agent suitable for use on various different tools, devices and containers. For example, the release agent of the present invention can be used to inhibit sticking of asphalt, concrete, and the like to the inner walls of containers within which these materials are stored and/or transported. The release agent of the present invention can also be used to inhibit such sticking to tools which are used to shape, smooth (such as trowels, floats, screeds, and the like), or otherwise manipulate these materials, as well as to inhibit sticking to the inner surfaces of pipes, troughs, ducts or other conduits through which these materials are moved, and to inhibit sticking in mixers within which these material are mixed.

The present invention is suitable for forming a variety of different structures in a more cost effective manner. As discussed above, cost savings are realized by both a reduction in materials costs and a reduction in labor costs.

Thus, specific embodiments and applications of the release agent of the present invention have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A release agent comprising oil, yellow grease #2, and optionally water, wherein the oil, the yellow grease #2, and the water are present in the release agent in a ratio such that the release agent has least one of a viscosity greater than approximately 65 cSt and a specific gravity of equal or less than approximately 0.95.

2. The release agent of claim 1, wherein the release agent has a viscosity of between approximately 65 cSt and approximately 75 cSt.

3. The release agent of claim 1, wherein the release agent has a viscosity of approximately 70 cSt.

4. The release agent of claim 1, wherein the oil comprises soybean oil.

5. The release agent of claim 1, wherein the oil comprises unfiltered soybean oil.

6. The release agent of claim 1, wherein the oil comprises unfiltered soybean oil having approximately 6% to approximately 10%, by weight, of solids.

7. The release agent of claim 1, wherein the water is present in an amount of less than 2 wt %.

8. The release agent of claim 1, wherein the release agent has a specific gravity of between approximately 0.90 and approximately 0.95.

9. The release agent of claim 8, wherein the release agent has a specific gravity of between 0.92 and 0.93.

10. The release agent of claim 1, further comprising at least one of a foaming agent, an emulsifier, a surfactant, and a coloring agent.

11. The release agent of claim 1, wherein the oil comprises a combination of new and used oil.

12. The release agent of claim 1, wherein the oil comprises substantially soybean oil.

13. A method for forming a structure, comprising:
    applying a release agent according to claim 1 to a form;
    pouring at least one of asphalt and concrete into the form to define the structure; and
    removing the form from the structure.

14. The method of claim 13 wherein the structure comprises a roadway or sidewalk.

* * * * *